United States Patent [19]

Feldmann et al.

[11] 4,028,314

[45] June 7, 1977

[54] POLYLAURYLLACTAM HAVING A LOW FISHEYE GEL CONTENT

[75] Inventors: Rainer Feldmann; Roland Feinauer, both of Marl, Germany

[73] Assignee: Chemische Werke Huls Aktiengesellschaft, Marl, Germany

[22] Filed: Sept. 26, 1975

[21] Appl. No.: 617,147

[30] Foreign Application Priority Data

Oct. 9, 1974 Germany .................... 2448047

[52] U.S. Cl. ...................... 260/78 L; 260/45.8 NZ; 260/45.8 SN; 260/78 A

[51] Int. Cl.² .................. C08G 69/14; C08G 69/16

[58] Field of Search ........ 260/78 L, 78 S, 45.8 NZ, 260/45.8 SN

[56] References Cited

UNITED STATES PATENTS

| | | | |
|---|---|---|---|
| 3,251,799 | 5/1966 | Pietrusza et al. ................ | 260/78 L |
| 3,308,091 | 3/1967 | Zapp ............................... | 260/78 SC |
| 3,459,702 | 8/1969 | Tazewell ........................ | 260/78 SC |
| 3,488,325 | 1/1970 | Pietrusza et al. ................ | 260/78 L |
| 3,558,553 | 1/1971 | Hayes ........................... | 260/45.75 C |
| 3,625,922 | 12/1971 | Ando et al. ..................... | 260/78 L |

*Primary Examiner* — Harold D. Anderson
*Attorney, Agent, or Firm* — Gilbert L. Wells

[57] ABSTRACT

Polylauryllactam having a low fisheye gel content, containing about 0.01 – 1.5 percent by weight of compounds of the general formula

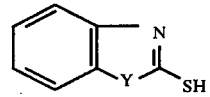

wherein Y is a sulfur or oxygen atom or an NH-group, based on the weight of polylauryllactam.

10 Claims, No Drawings

POLYLAURYLLACTAM HAVING A LOW FISHEYE GEL CONTENT

CROSS REFERENCES TO RELATED APPLICATIONS

The disclosure of Application Ser. No. 518,817, filed Oct. 29, 1974, now U.S. Pat. No. 3,951,909, is incorporated herein to show the state of the art of preparing polylauryllactam low in fisheye gel content. Application Ser. No. 518,817 discloses polylauryllactam low in fisheye gel content polymerized at temperatures ranging from about 260 to 340° C and in the presence of water and possibly in the presence of monocarboxylic acids having 2 – 18 carbon atoms or polycarboxylic acids having 2 – 12 carbon atoms as chain regulators, under pressure and with removal of the water, and possibly with post-condensation at temperatures ranging from about 200° to 300° C, wherein 2-hydroxyphenylbenzoxazole is added to the molten, lauryllactam monomer in such amounts that the polylauryllactam contains from about 0.05 to 1.5 percent by weight of 2-hydroxyphenylbenzoxazole.

BACKGROUND OF THE INVENTION

The field of the invention is synthetic resin polymerization and the present invention is particularly concerned with preparing polylauryllactam low in fisheye gel content by polymerizing lauryllactam at elevated temperatures in the presence of water and possibly of monoor dicarboxylic acids as chain regulators, the procedure taking place in a single step polymerization at temperatures ranging from 260° to 340° C or in a two-step polymerization at temperatures ranging from about 260 to 340° C during the first step thereof and from about 200° to 300° C in the second step of post-condensation.

The state of the prior art of polymerizing lauryllactam (nylon-12) may be ascertained by reference to the Kirk-Othmer "Encyclopedia of Chemical Technology", Vol. 16 (1968), pages 88–105, particularly p. 92 and U.S. Pat. No. 3,799,899, the disclosures of which are incorporated herein. The 2-mercaptobenzothiazole additives of the present invention are disclosed in U.S. Pat. Nos. 3,308,091; 3,459,702 and 3,558,553, and these disclosures are also incorporated herein.

It is known to the prior art to produce polylauryllactam by the polymerization of lauryllactam in the presence of water and optionally chain regulators wherein, in a first stage, the process is conducted under pressure at a temperature of between 200° and 340° C and, in a second stage, between 270° and 340° C, as disclosed in German Published Application No. 1,495,149 and French Pat. No. 1,413,397. The products obtained according to this mode of operation possess a high fisheye gel content. The fisheye gels interfere with the production of threads, monofilaments, and especially films, causing opaque thickened portions and giving a non-homogeneous and unattractive appearance to the films, and furthermore, they make it difficult to imprint the material or make such imprinting even impossible.

It is likewise known to conduct the polymerization of lauryllactam in the presence of catalysts of the strong mineral acid type, such as phosphoric acid, phosphorous acid, or sulfonic acids at temperatures of between 280° and 300° C in a single stage, as disclosed in German Unexamined Laid-Open Application Nos. 1,520,551; 1,907,032; and 1,495,147, or to carry out the process first at temperatures of above 300° C and then optionally conduct a post condensation at temperatures of below the melting point of polylauryllactam, as disclosed in U.S. Pat. No. 3,564,599. However, working with such strong, acidic catalysts has the disadvantage that the polylauryllactam thus prepared is subjected, during the processing thereof, to an increased hydrolytic degradation, since the acidic catalysts employed remain in the polymer and additionally, the fisheye gel content here again is very high.

Furthermore, it is conventional to subject lauryllactam to a preliminary polymerization in a first stage at a temperature of 265° – 320° C and then to a post polymerization at a temperature lower than in the first stage, namely 220 – 265° C, as disclosed in U.S. Pat. No. 3,799,899. According to the process of U.S. Pat. No. 3,799,899, a polylauryllactam having a low fisheye gel content is obtained. However, in general, longer reaction times are required than when working at higher temperatures, so that the space time yield is reduced. However, during disturbances in the operation, it can happen that the polylauryllactam is exposed to high temperatures for longer periods of time, so that then fisheye gels can occur.

In order to stabilize polyamides, numerous compounds have been known utilized essentially as heat or oxidation stabilizers as well as light stabilizers. A reduction in the gel formation has not been observed in this connection. German Published Application No. 1,694,473 merely mentions that copper compounds, in combination with lithium iodide, used for the heat stabilization of polyamides, simultaneously exhibit a reduced tendency toward gel formation. However, the polyamides are strongly discolored and the indicated examples refer exclusively to polyamide 6—6. Additionally, copper compounds are undesirable in finished polyamide articles coming into contact with foodstuffs, e.g., films for grocery packaging. According to U.S. Pat. No. 3,715,340, alkyl ammonium salts or alkylene bis(ammonium) salts of an aromatic carboxylic acid are added prior to polymerization to prevent the gel formation in polyamide 6. However, it is known that carboxylic acids and amines formed during the polycondensation from the ammonium salts are used during the production of polyamides for chain regulation, as disclosed in "Kunststoff-Handbuch", Vol. IV, Vieweg/-Mueller, "Polyamide", pp. 19 et seq., 1966. The carboxylic acid reacts with the amino groups of the polymer and terminates the chain growth, whereas the amine component of the salt can react with the carboxylic acid groups of the polymer. Thus, the ammonium salts are completely incorporated into the polymer, i.e., with an addition of, for example, 0.5 molar percent, it is no longer possible to exceed a certain maximum intermediate molecular weight.

Suggestions have furthermore been advanced for obtaining polylauryllactam of a low fisheye gel content wherein 0.05 – 1.5 percent by weight of 2-hydroxyphenylbenzoxazole is contained in the polylauryllactam, as disclosed in U.S. Pat. No. 3,951,909.

SUMMARY OF THE INVENTION

Having in mind the limitations of the prior art, it is an object of the present invention to produce a colorless polylauryllactam having a low fisheye gel content and having up to any desired high molecular weight, and furthermore in a good space time yield. This object is achieved by providing a polylauryllactam containing compounds of the general formula

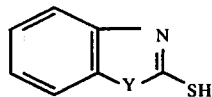

wherein Y represents a sulfur or oxygen atom or an NH-group, in quantities of about 0.01 – 1.5 percent by weight, preferably in amounts of about 0.05 – 1.0 percent by weight, based on the total weight of polylauryllactam.

According to a preferred mode of operation, these compounds, preferably 2-mercaptobenzothiazole, are added during the polycondensation in such amounts that, based on the polylauryllactam, there is contained therein about 0.01 – 1.5 percent by weight, preferably about 0.05 – 1.0 percent by weight. Compounds of the general formula include but are not limited to: 2-mercaptobenzothiazole, 2-mercaptobenzoxazole, and 2-mercaptobenzimidazole, preferably 2-mercaptobenzothiazole. These compounds can also be added to a fisheye-free polylauryllactam in the same amounts in the melt after the condensation and after removal of the water, or during processing on the extruder, i.e., at temperatures of between 220° and 320° C, especially between 240° and 280° C. This polylauryllactam then remains, in case of a further exposure to heat, low in fisheyes for a substantially longer period of time.

Such a fisheye-free polylauryllactam obtained in the absence of one of the above-mentioned compounds is obtained for example, according to the process of the previously mentioned U.S. Patent 3,799,899.

2-Mercaptobenzothiazole as well as 2-mercaptobenzimidazole are conventional additives in the oxidation stabilization or heat stabilization of polyamide 6 and polyamide 6–6. This stabilization, however, is effected exclusively in combination with further substances, e.g., with copper salts or in the form of copper complexes, in part together with further compounds, as disclosed in U.S. Pat. Nos. 3,308,091 and 3,558,553; Belgian Pat. No. 607,392; Japanese Pat. Nos. 73-22,183; 73-08,460; 71-18,625; 73-07,858; 73-07,859; 73-07,860; and 73-08,737. Copper salts, especially the frequently disclosed iodides, cause discoloring of the polyamides and are undesirable in finished articles coming into contact with foodstuffs. Furthermore, as shown by comparative examples which follow, no reduction in the gel formation is observed when adding, for example, copper iodide or potassium iodide to 2-mercaptobenzothiazole.

It was, therefore, surprising that the aforementioned compounds, according to the present invention, effect by themselves a reduction in the gel formation, whereas the described stabilizer systems do not bring about a decrease in gel formation.

French Pat. No. 1,400,175 and Belgian Pat. No. 650,173 describe generally metallic salts of 2-mercaptobenzothiazole or 2-mercaptobenzimidazole; and U.S. Pat. No. 3,459,702 discloses 2-mercaptobenzothiazole together with an aromatic amine for the stabilization of polyamides. These additives likewise discolor the polyamide and are risky in contact with foodstuffs.

Thus, the state of the art does not yield any teaching for the production of polylauryllactam having a low fisheye gel content and being perfect from the color viewpoint and in physiological respects.

According to the process of the present invention, the compounds according to the present invention, preferably 2-mercaptobenzothiazole, are added to the lauryllactam prior to the polycondensation, when the latter is, for example, in the molten condition i.e., at temperatures of between 190° and 320° C. The polycondensation is carried out conventionally by heating the lauryllactam with water to a high temperature, e.g., to between 260° and 340° C under pressure, until the desired degree of conversion has been reached. In addition to this single stage mode of operation, it is also possible as mentioned above to carry out a subsequent post-condensation at temperatures of between 200° and 300° C.

However, the compounds of the present invention can also be admixed to a finished polylauryllactam of low fisheye content in the melt, for example in an extruder. The polylauryllactam can also contain other additives which can be added to the lauryllactam before, during, or after the polycondensation. Examples for such additives are viscosity stabilizers, e.g. acetic acid, adipic acid, phosphoric acid, pigments, or flatting agents, e.g. titanium dioxide.

DESCRIPTION OF THE PREFERRED EMBODIMENTS

The present invention is explained in greater detail below with reference to specific examples, wherein in the first examples the compounds of the present invention are admixed to a finished, fisheye-free polylauryllactam, the mixture is heated to 320° C for a certain period of time, and then the amount of gelled polyamide is determined by weighing the proportions insoluble in m-cresol at 70° C. Thereafter, examples are set forth wherein these compounds are added to the lauryllactam prior to the polycondensation, the polylauryllactam is processed into blown films, and the fisheye gel content is determined in these films.

COMPARATIVE EXAMPLE 1

A sample of polylauryllactam, adjusted to a relative solution viscosity of 1.81 during the production with adipic acid and which did not have any proportions insoluble in m-cresol, was heated in a glass vessel under extremely pure nitrogen gas to 320° C for 48 hours. The sample was then dissolved in m-cresol at 70° C (0.5 percent strength solution). The proportion insoluble in the solvent was vacuum-filtered, dried, and weighed.

Gel proportion: 30 percent.

COMPARATIVE EXAMPLE 2

The procedure of Comparative Example 1 was followed, adding to the polylauryllactam, prior to heating, 1 percent by weight of a commercial stabilizer (4-hydroxy-3,5-di-tert.-butylphenylpropionic acid, esterified with an OH function of pentaerythritol, wherein the remaining three OH-functions of pentaerythritol are esterified with phosphoric acid).

Gel proportions: 80 percent.

COMPARATIVE EXAMPLE 3

This example was carried out according to Comparative Example 1, adding to the polylauryllactam, prior to heating, 0.05 percent of 2-mercaptobenzothiazole, together with 0.05 percent of copper iodide.

Gel proportion: 57 percent (color: dark violet).

COMPARATIVE EXAMPLE 4

The procedure of Comparative Example 1 was followed, adding to the polylauryllactam, prior to heating, 0.5 percent of 2-mercaptobenzothiazole, together with 0.2 percent of potassium iodide.

Gel proportion: 80 percent (color: yellow).

COMPARATIVE EXAMPLE 5

20 kg. of lauryllactam was condensed together with 0.2 percent of adipic acid in the presence of 8 percent of $H_2O$ for 6 hours at 290° – 300° C and under 18 atmospheres of vapor pressure under agitation in a 50-liter pressure vessel. Thereafter, an expansion was conducted for 2 hours, nitrogen was passed over the reaction mixture for ¼ hours, and the mixture was granulated, thus obtaining a colorless polyamide having a solution viscosity of 1.90. To determine the fisheye gel content, blown films were produced.

Fisheye gel content value: 3.

EXAMPLE 1

The process of Comparative Example 1 was followed, adding to the polylauryllactam, prior to heating, 1 percent of 2-mercaptobenzothiazole.

Gel proportion: 4 percent.

EXAMPLE 2

The procedure was carried out analogously to Comparative Example 1, adding to the polylauryllactam, prior to heating, 0.05 percent of 2-mercaptobenzothiazole.

Gel proportion: 2 percent.

EXAMPLE 3

The process of Comparative Example 1 was employed, adding to the polylauryllactam, prior to heating, 0.5 percent of 2-mercaptobenzoxazole.

Gel proportion: 5 percent.

EXAMPLE 4

The procedure of Comparative Example 1 was employed, adding to the polylauryllactam, prior to heating, 0.5 percent of 2-mercaptobenzimidazole.

Gel proportion: 7 percent.

EXAMPLE 5

The procedure of Comparative Example 5 was employed, adding to the lauryllactam, 0.1 percent of 2-mercaptobenzothiazole prior to the polymerization. The polyamide was colorless and had a relative solution viscosity of 1.81. To determine the fisheye gel content, blown films were produced.

Fisheye gel content value: 1 – 2.

The fisheye gel content was evaluated by the gel fisheyes clearly visible in the films, in accordance with the following subjective evaluating code:

Fisheye gel values

Value 1: no fisheye gels;

Value 2: very few and only very small fisheye gels which do not interfere;

Value 3: many, and also larger, fisheye gels, greatly interfering.

The relative solution viscosity was measured at 25° C in m-cresol at a concentration of 0.5 g/100 ml according to German Industrial Standard DIN 53727.

I claim:

1. A film forming polyamide composition having a low fisheye gel content consisting essentially of about 98.5 to 99.99 percent by weight polylauryllactam and about 0.01 to 1.5 percent by weight of a compound of the general formula

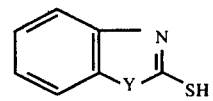

wherein Y is a sulfur or oxygen atom or an NH-group.

2. The polyamide composition of claim 1, wherein said polylauryllactam is about 99.0 to 99.95 percent by weight and said compound of the general formula is about 0.05 to 1.0 percent by weight.

3. The polyamide composition of claim 2, wherein said compound of the general formula is 2-mercaptobenzothiazole.

4. In a process for preparing film forming polyamides which comprises heating lauryllactam monomer as an initial polyamide-forming reactant under superatmospheric pressure with water in an amount of at least 0.1 mole of water per mole of the lauryllactam monomer at a temperature of about 260° to 340° C, the improvement comprising:

adding a compound of the general formula

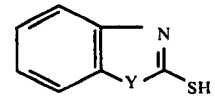

wherein Y represents a sulfur or oxygen atom or an NH-group, to said lauryllactam monomer in a molten state in sufficient concentration to produce polylauryllactam having about 0.01 to 1.5 percent by weight of said compound of the general formula.

5. The process of claim 4, wherein said concentration is about 0.05 to 1.0 percent by weight.

6. The process of claim 4, further comprising carrying out a post-condensation polymerization step at temperatures of about 200° to 300° C.

7. The process of claim 6, wherein said heating is carried out for about 5–10 hours and said post-condensation polymerization step is carried out for about 0.5 to 10 hours.

8. The process of claim 6, wherein said heating is conducted in the presence of a chain regulator selected from the group consisting of monocarboxylic acids having 2–18 carbon atoms and dicarboxylic acids having 2–12 carbon atoms, said chain regulator having a concentration of about 0.05 to 2 molar percent.

9. The process of claim 4, wherein said compound of the general formula is 2-mercaptobenzothiazole.

10. The process of claim 5, wherein said compound of the general formula is 2-mercaptobenzothiazole.

* * * * *